(12) United States Patent
Klask

(10) Patent No.: US 8,555,180 B2
(45) Date of Patent: Oct. 8, 2013

(54) SMART PERIPHERAL ARCHITECTURE FOR PORTABLE MEDIA PLAYERS

(75) Inventor: Kenneth J. Klask, San Jose, CA (US)

(73) Assignee: Amulet Technologies, LLC, Campbell, CA (US)

( * ) Notice: Subject to any disclaimer, the term of this patent is extended or adjusted under 35 U.S.C. 154(b) by 1668 days.

(21) Appl. No.: 11/692,175

(22) Filed: Mar. 27, 2007

(65) Prior Publication Data

US 2008/0244426 A1    Oct. 2, 2008

(51) Int. Cl.
*G06F 13/00*    (2006.01)
*G06F 15/00*    (2006.01)

(52) U.S. Cl.
USPC .......................................... 715/763; 715/789

(58) Field of Classification Search
USPC ......... 715/740, 784, 863, 763–765, 789, 867, 715/716, 788, 200–277
See application file for complete search history.

(56) References Cited

U.S. PATENT DOCUMENTS

| | | |
|---|---|---|
| 6,288,716 B1 | 9/2001 | Humpleman et al. |
| 6,556,219 B1 | 4/2003 | Wugofski |
| 7,100,118 B1 | 8/2006 | Klash |
| 2005/0144070 A1 | 6/2005 | Cheshire |
| 2008/0109734 A1* | 5/2008 | Castagno ............... 715/740 |
| 2008/0168402 A1* | 7/2008 | Blumenberg ........... 715/863 |

FOREIGN PATENT DOCUMENTS

| | | |
|---|---|---|
| GB | 2375851 A | 11/2002 |
| WO | 2004021106 A2 | 3/2004 |
| WO | 2006124277 A2 | 11/2006 |

OTHER PUBLICATIONS

International Search Report and Written Opinion, 13 pages.
"Inflextion Platform UI", A Technical Paper, A New Approach to User Interface Creation for Consumer Electronic Devices, Mentor Graphics, pp. 1-8.

* cited by examiner

*Primary Examiner* — Cao "Kevin" Nguyen
(74) *Attorney, Agent, or Firm* — Patent Law Group LLP; David C. Hsia

(57) ABSTRACT

A new peripheral architecture is provided that allows a UI document to be embedded into a peripheral. The UI document is sent to a portable media player when the peripheral is plugged into the portable media player. The portable media player interprets this UI document to allow a user to interact with the accessory. The peripheral does not interpret this UI document but it does respond to interactions with the portable media player as the portable media player interprets the documents in response to user interactions.

20 Claims, 3 Drawing Sheets

SMART PERIPHERAL ARCHITECTURE FOR PORTABLE MEDIA PLAYERS

CROSS REFERENCE TO RELATED APPLICATION

This application is related to U.S. patent application Ser. No. 11/502,071, entitled "Graphical user interface engine for embedded systems," filed on Aug. 9, 2006, which is a continuation of U.S. Pat. No. 7,100,118, which are commonly assigned and incorporated herein by reference.

FIELD OF INVENTION

This invention relates to smart peripherals for portable media players.

DESCRIPTION OF RELATED ART

A portable media player is a hard disk or flash memory based electronic device capable of storing and playing files in one or more media formats. Since October 2004, iPod sales have dominated the market for digital music players in the United States. The success of the iPod has created demand for fashionable accessories, such as protective "skins," powered speakers, remote controls, and etc. for the iPod. In fact, a large peripheral market is a significant advantage that Apple has over its competition.

In general, there are two classes of accessories: (1) passive accessories, and (2) interactive accessories. The majority of the accessories are passive accessories that either have no electronic content, such as "skins" and cases, or they contain electronics that cannot carry on an interactive dialog with the end user through the user interface that is built-in to the iPod. Examples of passive electronic accessories are headphones and amplified speaker systems—they just passively receive the analog audio signal from the headphone jack. If these devices have features that require user interaction, other than volume control and play list navigation, then they must have their own independent controls.

A small number of interactive accessories do exist. Examples are the Nike+iPod Sport Kit, Apple Radio Remote, and the Griffin iTrip. All of these accessories interact with the user through the user interface that is built into the iPod. All of these accessories are sophisticated enough to require extra user interaction beyond the user interaction that is already built into the standalone iPod software. However, the high cost of building the required user interface (UI) into these accessories would price them out of the market. So, the accessory developer must either build a cheaper, less functional man machine interface, or figure out a way to use the iPod's UI.

The only available method for tapping into the existing iPod UI is to write and install a unique application program onto the iPod. The additional program would need to be installed on the iPod prior to plugging in the accessory. Unfortunately, the Apple iPod is a closed platform. Thus, third party accessory developers are not able to develop add-on programs for the iPod. Rightly so, Apple uses this closed platform strategy to protect its market leading iPod intellectual property. Using the current technology, Apple has to internally develop the application and they have to distribute it packaged with the iPod firmware in new iPods. For older iPods, their firmware must be updated with the UIs for new interactive peripherals.

While this approach does protect Apple, it doesn't protect the accessory manufacturer. This is because the application is included with the iPod software even if an iPod customer does not buy the accessory. For example, a manufacturer could build a peripheral interface to a treadmill that mimics the data sent by the Nike+ accessory. The treadmill would appear to work just like a Nike+ shoe because the Nike application written by Apple is already shipped for free with every iPod.

Other disadvantages to Apple's current approach are: (1) it is a huge drain on Apple's engineering resources since they have to personally develop every application, (2) this limits the number of interactive accessories that can be produced because third party developers cannot participate in the development, and (3) Apple's market leading position could be at danger to an open platform just as history shows that the open PC platform took away Apple's lead in the computer industry.

While the iPod has been discussed above, similar issues apply to all portable media players in general. Thus, what is needed is a new peripheral architecture that allows portable media player manufacturers to protect their internal software and intellectual property, but that is open enough to allow third party accessory designers to program the UI application for their devices. Furthermore, the IP and the market for the accessory should also be protected to encourage a proliferation of third party accessories.

SUMMARY

In one embodiment of the invention, a new peripheral architecture is provided that allows a UI document to be embedded into a peripheral. The UI document is sent to a portable media player when the peripheral is plugged into the portable media player. The portable media player interprets this UI document to allow a user to interact with the accessory. The peripheral does not interpret this UI document but it does respond to interactions with the portable media player as the portable media player interprets the documents in response to user interactions.

BRIEF DESCRIPTION OF THE DRAWINGS

Use of the same reference numbers in different figures indicates similar or identical elements.

DETAILED DESCRIPTION

Figure 1:
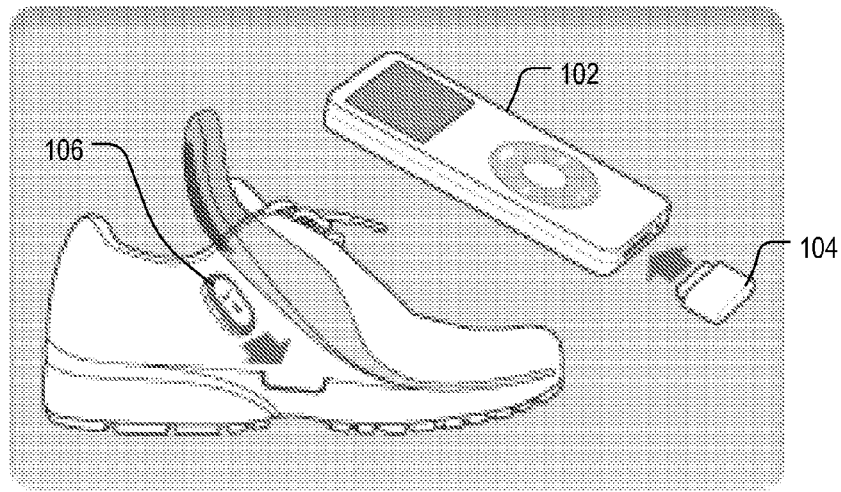
FIG. 1 is a diagram illustrating a conventional portable media player connected to an interactive peripheral.

FIG. 1 illustrates a portable media player 102 connected to an interactive peripheral, which includes a wireless receiver 104 and a wireless sensor 106. As described above, a portable media player may have a closed platform so that the UI for the interactive peripheral has to be developed internally by portable media player manufacturer and packaged with the portable media player firmware in new portable media players. On older portable media players, their firmware must be updated to provide the UI for the interactive peripheral.

Figure 2:
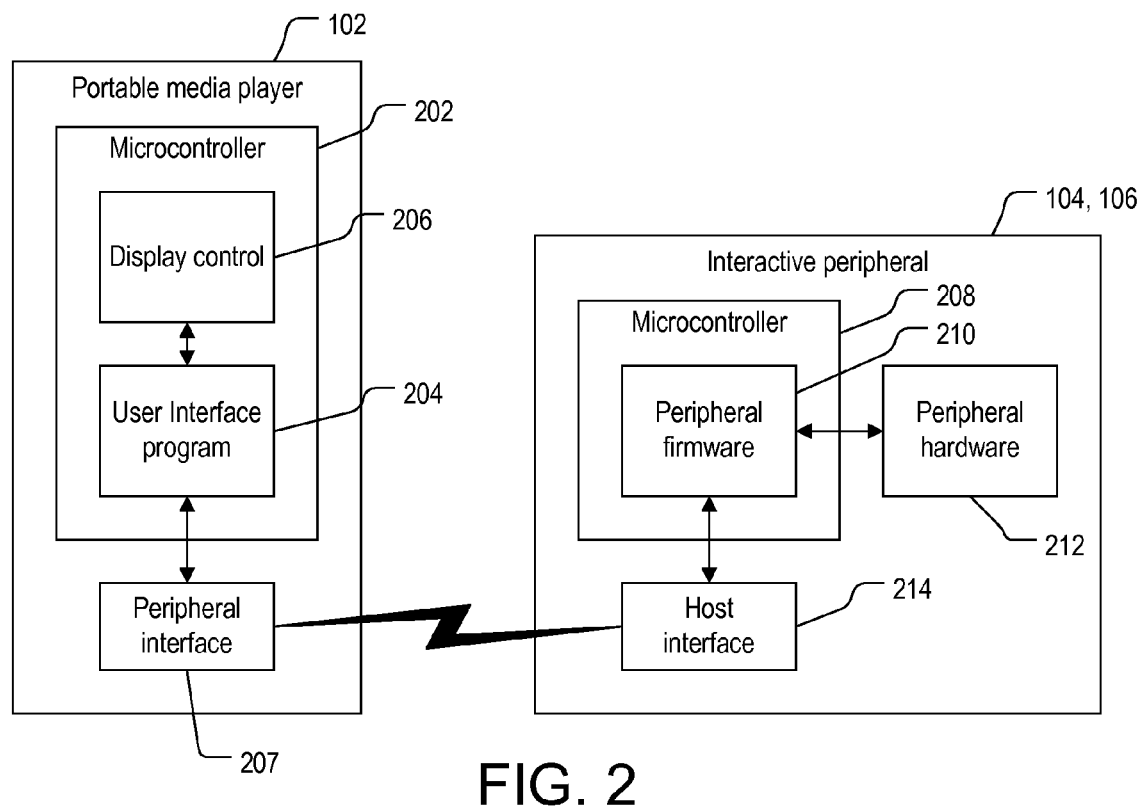
FIG. 2 is a block diagram of a conventional peripheral architecture for a portable media player.

FIG. 2 is a block diagram of a conventional peripheral architecture for portable media player 102. Portable media player 102 includes a microcontroller 202 that executes a portable media player firmware to perform the various device functions. The firmware includes a UI program 204 that defines the appearance and the functionality of the UI, including features specific to peripheral devices, and a display control 206 that draws the UI on a display (not shown). As described above, the firmware must be updated so UI program 204 can provide the additional UI for interactive peripheral 104/106. A peripheral interface 207 couples portable media player 102 to interactive peripheral 104/106.

Interactive peripheral 104/106 includes a microcontroller 208 that executes a peripheral firmware 210 to perform the various device functions. Peripheral firmware 210 controls and monitors peripheral hardware 212 to perform the various device functions. A host interface 214 is coupled with peripheral interface 207 to interface interactive peripheral 104/106 and portable media player 102. Peripheral firmware 210 is also responsible for communication with UI program 204 on portable media player 102 via host interface 214

Figure 3:
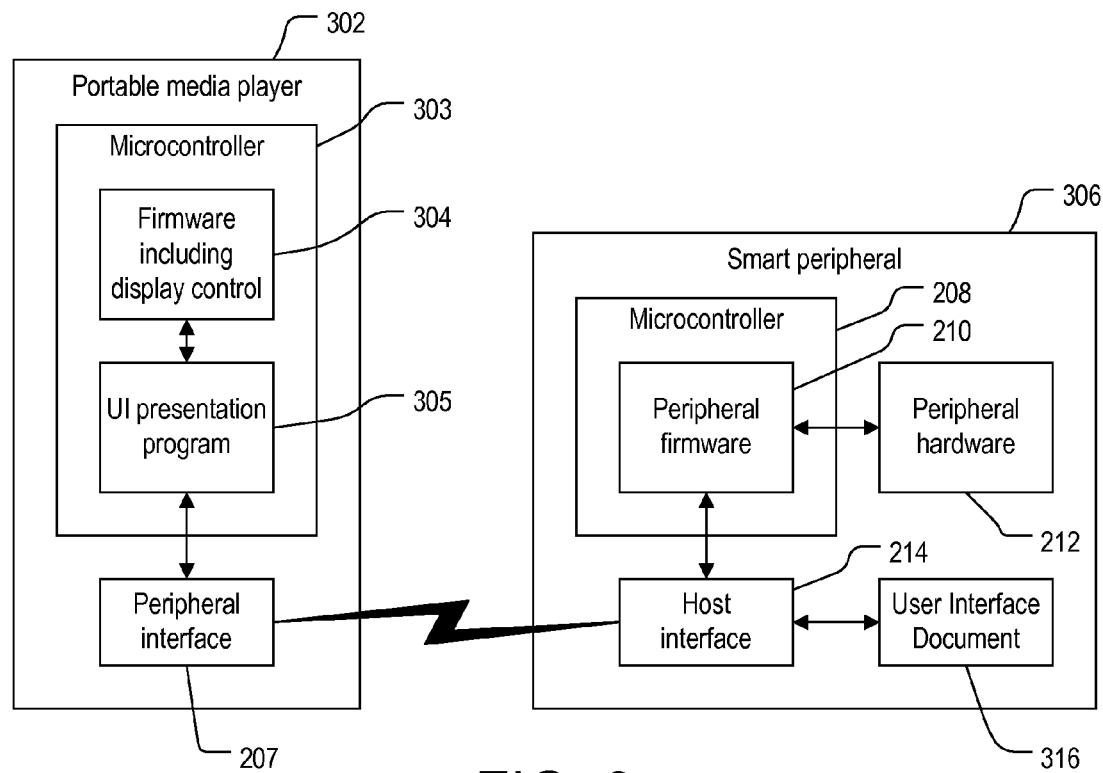
FIG. 3 is a block diagram of a smart peripheral architecture for a portable media player in one embodiment of the invention.

FIG. 3 is a block diagram of a smart peripheral architecture for portable media player 302 in one embodiment of the invention. Portable media player 302 includes a microcontroller 303 that executes (1) firmware 304, including display control, and (2) a UI presentation program 305. Based on a UI document 316 from smart peripheral 306, UI presentation program 305 generates a UI for smart peripheral 306 and writes the UI to the display control. UI presentation program 305 receives user inputs and exchanges information (e.g., variables and function calls) with smart peripheral 306 and firmware 304 as defined by UI document 316. In response to the user inputs and the exchanged information, UI presentation program 305 updates the UI and modifies the operations of smart peripheral 306 and portable media player 302. Smart peripheral 306 stores UI document 316 in memory and communicates UI document 316 to portable media player 302 when they are connected. Thus, portable media player 302 does not need to be preconfigured or updated with the UI for smart peripheral 306.

In one embodiment, UI presentation program 305 communicates directly with smart peripheral 306 through peripheral interface 207. In another embodiment, UI presentation program 305 communicates with smart peripheral 306 through firmware 304, which includes the various drivers for communicating with the display and peripheral interface 207.

In one embodiment of the invention, UI presentation program 305 is software that emulates the functions of a GUI processor chip described in U.S. application Ser. No. 11/502,071 and U.S. Pat. No. 7,100,118, while UI document 316 is a GUI document described in U.S. application Ser. No. 11/502,071 and U.S. Pat. No. 7,100,118. The GUI processor chip is available as the Amulet Graphical OS chip from Amulet Technologies of Santa Clara, Calif. In such an embodiment, UI presentation program 305 has a library storing executable codes that define the appearances and the functions of graphic user interface (GUI) objects. UI document 316 includes non-executable codes that identify the graphic user interface (GUI) objects (also known as "widgets") that make up the UI, their parameter attributes (e.g., source of inputs, destination of outputs, and update rates), and their layout in the UI. UI presentation program 305 parses UI document 316 to determine the GUI objects, their parameter attributes, and the layout of the GUI objects. UI presentation program 305 then generates the UI from the executable codes for the GUI objects in the library.

Widgets can be divided into control and view widgets. Control widgets are input objects, like function buttons, sliders, radio buttons, and other similar UI objects used to control portable media player 302 or smart peripheral 306. For instance, a function button can send information to firmware 304 or smart peripheral 306 every time it receives an input from a user (i.e., a user event). Some control widgets are invisible such as "timer widgets" and "alarm widgets." For instance, an "alarm widget" could send information to smart peripheral 306 each time firmware 304 changes a specific variable.

View widgets are output objects, like bargraphs, numeric fields, string fields, and similar UI objects to display information from firmware 304 of portable media player 302 or smart peripheral 306. For instance, a bargraph can request information from firmware 304 or smart peripheral 306 and update the bargraph with the information.

Figure 4:
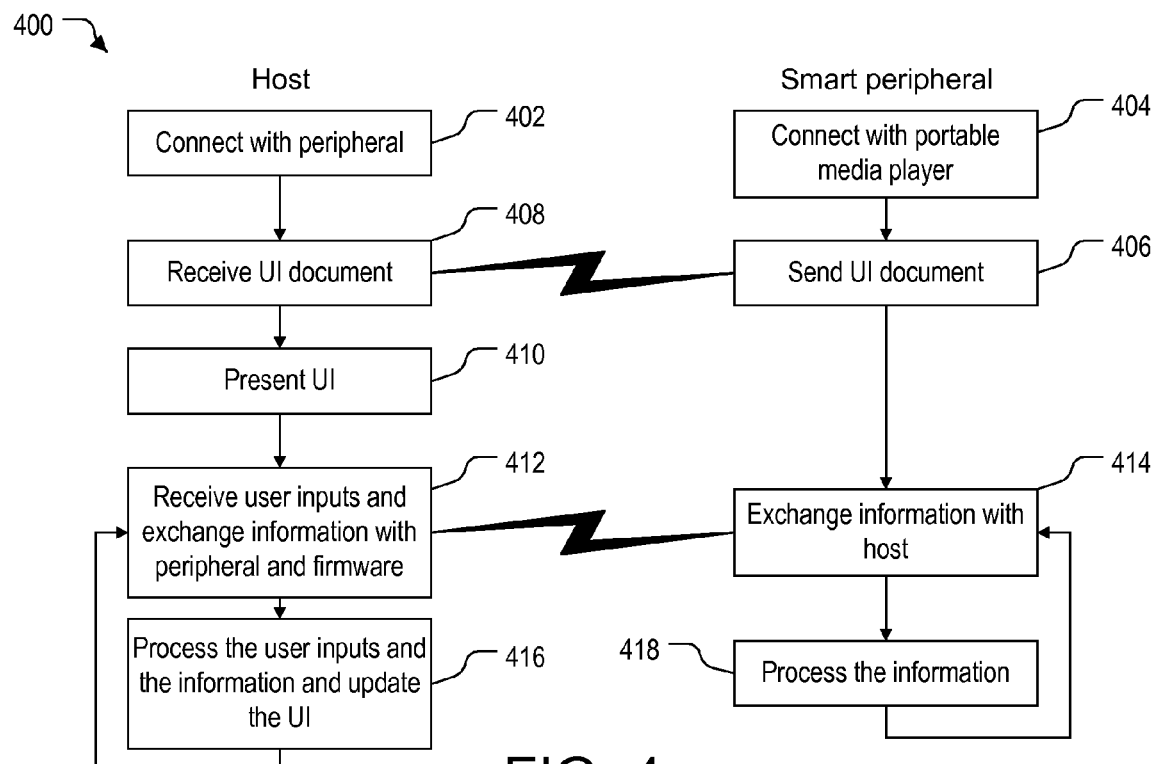
FIG. 4 is a method for the smart peripheral architecture of FIG. 3 in one embodiment of the invention.

FIG. 4 is a flowchart of a method 400 for the smart peripheral architecture of FIG. 3 in one embodiment of the invention. The actions of portable media player 302 are presented in the left column while the actions of smart peripheral 306 are presented in the right column.

In steps 402 and 404, portable media player 302 and smart peripheral 306 are connected. This occurs when the user plugs smart peripheral 306 into portable media player 302 or when the user turns on the two devices when they are already connected. Note that the connection can be wired or wireless.

In step 406, smart peripheral 306 sends UI document 316 to portable media player 302.

In step 408, portable media player 302 receives the UI document 316 from smart peripheral 306 and provides it to UI presentation program 305.

In step 410, UI presentation program 305 generates the UI based on UI document 316. Specifically, UI presentation program 305 parses UI document 316 to determine the layout and the functionality of the UI and then generates the UI accordingly.

In step 412, UI presentation program 305 receives user inputs through the UI as described in UI document 316. The user inputs may be commands to modify the operations of portable media player 302 or smart peripheral 306. Note that the user can provide the user inputs through physical input devices or GUI objects on a touch screen, which are then provided directly to UI presentation program 305 or through firmware 304.

UI presentation program 305 also exchanges information with firmware 304 and smart peripheral 306 as described in UI document 316. The exchanged information may be variables from firmware 304 or smart peripheral 306 to be displayed on the UI. For example, firmware 304 may provide the song name and the song time to be displayed on the UI.

The exchanged information may also be commands to modify the operations of portable media player 302 or smart peripheral 306. These commands may originate from user events or portable media player events. For example, UI presentation program 305 may need to control smart peripheral 306 in a particular manner when firmware 304 informs UI presentation program 305 that it has reached the end of a song. Note that UI presentation program 305 may communicate directly with smart peripheral 306 or through firmware 304.

In step 414, smart peripheral 306 exchanges information with UI presentation program 305. As described above, smart peripheral 306 may send variables for display in the UI or commands to modify the operation of portable media player 302. Furthermore, smart peripheral 306 may receive commands from UI presentation program 305 to modify the operation of smart peripheral 306.

In step 416, UI presentation program 305 updates the UI in response to the user inputs from the user and the information from firmware 304 and smart peripheral 306. If necessary, UI presentation program 305 modifies the operations of portable media player 302 in response to the information. Step 416 loops back to step 412 to continuously update the UI and interact with the user and smart peripheral 306.

In step 418, smart peripheral 306 processes the information received from portable media player 302. If necessary, smart peripheral 306 modifies its operations in response to the information. Step 418 loops back to step 414 to continue its interaction with portable media player 302.

Note that portable media player 302 may remove or cache UI document 316 when smart peripheral 306 is disconnected.

Figure 5:
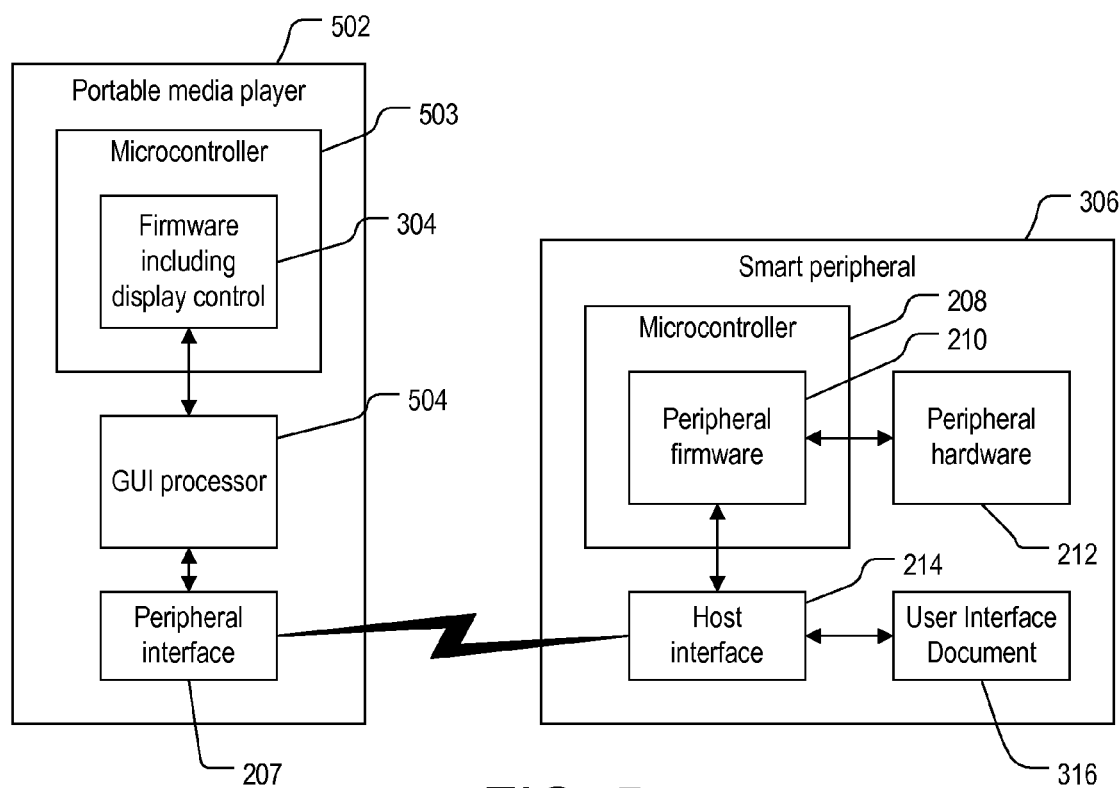
FIG. 5 is a block diagram of a smart peripheral architecture for a portable media player in one embodiment of the invention.

FIG. 5 is a block diagram of a smart peripheral architecture for portable media player 502 in one embodiment of the invention. Portable media player 502 is similar to portable media player 302 except that it uses a microprocessor 503 without UI presentation program 305, which has been replaced with a GUI processor 504 described in U.S. application Ser. No. 11/502,071 and U.S. Pat. No. 7,100,118. GUI processor 504 performs the same function as UI presentation program 305 so that method 400 of FIG. 4 described above also applies to portable media player 502.

Various other adaptations and combinations of features of the embodiments disclosed are within the scope of the invention. Numerous embodiments are encompassed by the following claims.

What is claimed is:

1. A method for a portable media player compatible with a peripheral device, comprising:
   connecting to the peripheral device;
   receiving from the peripheral device a user interface (UI) document defining layout and functionality of a UI for interacting with the peripheral device, the UI document identifying a widget and an update rate for the widget; and
   executing a UI presentation program by a microprocessor of the portable media player to generate the UI based on the UI document, the executing comprising:
      displaying the UI for the peripheral device on a display of the portable media player;
      periodically requesting information from the peripheral device at the update rate in the UI document; and
      in response to the information, updating the UI in a manner described by the UI document.

2. The method of claim 1, wherein the executing further comprises:
   receiving an input originating from the portable media device; and
   in response to the input, updating the UI in a manner described by the UI document.

3. The method of claim 2, wherein the executing further comprises:
   in response to the input, modifying an operation of the peripheral device in a manner described by the UI document.

4. The method of claim 1, wherein the executing further comprises:
   receiving an input from the peripheral device; and
   in response to the input, updating the UI in a manner described by the UI document.

5. The method of claim 4, wherein the executing further comprises:
   in response to the input, modifying an operation of the portable media player in a manner described by the UI document.

6. The method of claim 1, wherein the executing further comprises:
   receiving an input from a user through the UI;
   in response to the input, (1) updating the UI in a manner described by the UI document and (2) transmitting an output to the peripheral device in a manner described by the UI document.

7. The method of claim 1, wherein the executing further comprises:
   receiving an input from a user through the UI;
   in response to the input, modifying an operation of the portable media player in a manner described by the UI document.

8. A method for a peripheral device compatible with a portable media player, comprising:
   connecting to the portable media player; and
   transmitting to the portable media player a user interface (UI) document defining layout and functionality of a UI for interacting with the peripheral device, wherein the UI document identifies a widget and an update rate for the widget, and a UI presentation program executed by a microprocessor of the portable media player generates and displays the UI based on the UI document.

9. The method of claim 8, further comprising:
   transmitting an output to the portable media player, wherein the UI presentation program updates the UI with the output.

10. The method of claim 8, further comprising:
    receiving an input from the UI presentation program on the portable media player; and
    modifying an operation of the peripheral device in response to the input.

11. A portable media player compatible with a peripheral device, the portable media player comprising:
    a microprocessor for executing a UI presentation program;
    a memory storing instructions for the UI presentation program, the instructions comprising steps for:
       generating a user interface (UI) based on a UI document received from the peripheral device, the UI document defining layout and functionality of the UI for the peripheral device, the UI document identifying a widget and an update rate for the widget;
       displaying the UI for the peripheral device on a display of the portable media player;
       periodically requesting information from the peripheral device at the update rate in the UI document; and
       in response to the information, updating the UI in a manner described by the UI document.

12. The portable media player of claim 11, wherein the steps of the instructions for the UI presentation program further comprises:
    receiving an input originating from the portable media device; and
    in response to the input, updating the UI in a manner described by the UI document.

13. The portable media player of claim 12, wherein the steps of the instructions for the UI presentation program further comprises:
    in response to the input, modifying an operation of the peripheral device in a manner described by the UI document.

14. The portable media player of claim 11, wherein the steps of the instructions for the UI presentation program further comprises:
    receiving an input from the peripheral device; and
    in response to the input, updating the UI in a manner described by the UI document.

15. The portable media player of claim 14, wherein the steps of the instructions for the UI presentation program further comprises:

in response to the input, modifying an operation of the portable media player in a manner described by the UI document.

16. The portable media player of claim 11, wherein the steps of the instructions for the UI presentation program further comprises:
   receiving an input from a user through the UI;
   in response to the input, (1) updating the UI in a manner described by the UI document and (2) transmitting an output to the peripheral device in a manner described by the UI document.

17. The portable media player of claim 11, wherein the steps of the instructions for the UI presentation program further comprises:
   receiving an input from a user through the UI; and
   in response to the input, modifying an operation of the portable media player in a manner described by the UI document.

18. A peripheral device, comprising:
   a memory storing instructions comprising steps for:
   connecting to a portable media player; and
   transmitting to the portable media player a user interface (UI) document defining layout and functionality of a UI for the peripheral device, wherein the UI document identifies a widget and an update rate for the widget, and a UI presentation program executed by a microprocessor of the portable media player generates and displays the UI based on the UI document.

19. The peripheral device of claim 18, wherein the steps of the instructions further comprises:
   transmitting an output to the portable media player, wherein the UI presentation program updates the UI with the output.

20. The peripheral device of claim 18, wherein the steps of the instructions further comprises:
   receiving from the portable media player an input from the user; and
   in response to the input, modifying an operation of the peripheral device.

\* \* \* \* \*